(12) United States Patent
Relyea et al.

(10) Patent No.: US 9,036,318 B2
(45) Date of Patent: May 19, 2015

(54) METHOD OF TRIPPING A CIRCUIT INTERRUPTER IN A BACK FED CONFIGURATION

(71) Applicant: Eaton Corporation, Cleveland, OH (US)

(72) Inventors: Lanson D. Relyea, Moon Township, PA (US); Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 219 days.

(21) Appl. No.: 13/937,529

(22) Filed: Jul. 9, 2013

(65) Prior Publication Data

US 2015/0015999 A1    Jan. 15, 2015

(51) Int. Cl.
| | |
|---|---|
| *H01H 73/00* | (2006.01) |
| *H02H 3/00* | (2006.01) |
| *H02H 9/08* | (2006.01) |
| *H01H 9/54* | (2006.01) |
| *H02H 3/16* | (2006.01) |
| *H01H 71/00* | (2006.01) |
| *H02H 3/04* | (2006.01) |
| *H02H 7/00* | (2006.01) |

(52) U.S. Cl.
CPC ............... *H01H 9/54* (2013.01); *H02H 3/162* (2013.01); *H01H 71/00* (2013.01); *H02H 3/04* (2013.01); *H02H 7/008* (2013.01)

(58) Field of Classification Search
CPC ......... H01H 9/54; H01H 43/00; H01H 81/00; H02H 3/16; H02H 5/10
USPC ............................ 361/42–50, 93.1, 93.2, 115
See application file for complete search history.

(56) References Cited

U.S. PATENT DOCUMENTS

| | | | |
|---|---|---|---|
| 4,096,366 A | 6/1978 | Titus | |
| 6,433,982 B1 * | 8/2002 | Santos | 361/93.2 |
| 7,035,067 B2 * | 4/2006 | Schmalz et al. | 361/42 |
| 7,558,033 B2 * | 7/2009 | Zhou et al. | 361/42 |
| 7,633,728 B2 * | 12/2009 | Parker et al. | 361/42 |
| 7,685,447 B2 | 3/2010 | Parker | |
| 7,713,084 B1 | 5/2010 | Weeks et al. | |
| 7,952,842 B2 | 5/2011 | Engel | |
| 8,089,737 B2 | 1/2012 | Parker et al. | |
| 8,242,394 B2 | 8/2012 | Mueller et al. | |
| 2003/0063419 A1 * | 4/2003 | Nemir et al. | 361/78 |

(Continued)

OTHER PUBLICATIONS

European Patent Office, "International Search Report and Written Opinion", Aug. 29, 2014, 9 pp.

*Primary Examiner* — Thienvu Tran
*Assistant Examiner* — Christopher Clark
(74) *Attorney, Agent, or Firm* — Eckert Seamans Cherin & Mellott, LLC; Philip E. Levy

(57) ABSTRACT

A method of tripping a circuit interrupter in a back fed configuration is provided, wherein the circuit interrupter has separable contacts and an actuator, such as a solenoid, operatively coupled to the separable contacts. The method includes detecting within the circuit interrupter that a fault condition exists, and subsequent to detecting that the fault condition exists, determining whether a current is flowing within the circuit interrupter between a load side of the circuit interrupter and the separable contacts, and controlling operation of the actuator based on whether the current is flowing within the circuit interrupter.

13 Claims, 2 Drawing Sheets

(56) References Cited

U.S. PATENT DOCUMENTS

| | | | |
|---|---|---|---|
| 2006/0146465 A1* | 7/2006 | Esser | 361/93.1 |
| 2007/0121268 A1* | 5/2007 | Terhorst | 361/115 |
| 2009/0040666 A1* | 2/2009 | Elms et al. | 361/42 |
| 2010/0060469 A1* | 3/2010 | Hetzmannseder et al. | 340/639 |
| 2011/0046808 A1* | 2/2011 | Kellis et al. | 700/293 |
| 2011/0090607 A1* | 4/2011 | Luebke et al. | 361/42 |
| 2011/0216451 A1* | 9/2011 | Haines et al. | 361/42 |
| 2012/0019966 A1* | 1/2012 | DeBoer | 361/50 |

* cited by examiner

METHOD OF TRIPPING A CIRCUIT INTERRUPTER IN A BACK FED CONFIGURATION

BACKGROUND

1. Field

This invention pertains generally to circuit interrupters and, more particularly, to a method of tripping a circuit interrupter being operated in aback fed configuration.

2. Background Information

Circuit interrupters include, for example, circuit breakers, contactors, motor starters, motor controllers, and other load controllers and receptacles having a trip mechanism. Circuit breakers are used to protect electrical circuitry from damage due to, for example, an overcurrent condition, such as an overload condition or a relatively high level short circuit or fault condition, or an arc fault or ground fault condition. A circuit breaker typically includes a pair of separable contacts per phase. The separable contacts may be operated either manually by way of a handle disposed on the outside of the circuit breaker, or automatically in response to detection of an overcurrent condition. With respect to the automatic mode of operation, the circuit breaker typically includes: (i) operating mechanism operatively coupled to an actuator, such as a solenoid, which together are designed to rapidly open and close the separable contacts, and (ii) a trip unit which senses overcurrent conditions and in response causes the actuator and operating mechanism to move the separable contacts to their open position.

Most commonly, circuit breakers are forward fed, meaning that an AC power source is connected to the line side of the circuit breaker and power is delivered to a load coupled to the load side of the circuit breaker through the separable contacts of the breaker. In such a configuration, in a fault condition, the circuit breaker measures the voltage on the load side of the separable contacts to determine when to stop firing the actuator (e.g., the solenoid). More specifically, when there is no voltage being sensed on the load side (i.e., because the separable contacts have been successfully opened), the firing of the actuator will be stopped.

It is also known to operate circuit breakers in a back fed application wherein an AC power source, such as, without limitation, a photovoltaic cell array with an inverter or DC-to-AC converter, is connected to the load side of the circuit breaker and power is delivered to the line side through the separable contacts of the breaker. In such a configuration, voltage remains on the load side of the breaker even when the breaker is in the tripped or disconnected state. This is problematic as it will cause the breaker to continue to fire the actuator (e.g., solenoid), even though the breaker is already disconnected, until the actuator fails.

SUMMARY

These needs and others are met by embodiments of the disclosed concept, which are directed to a method of tripping a circuit interrupter being operated in aback fed configuration, and a circuit interrupter and power system implementing such a method.

In one embodiment, a method of tripping a circuit interrupter in a back fed configuration is provided, wherein the circuit interrupter has separable contacts and an actuator, such as a solenoid, operatively coupled to the separable contacts. The method includes detecting within the circuit interrupter that a fault condition exists, and subsequent to detecting that the fault condition exists, determining whether a current is flowing within the circuit interrupter between a load side of the circuit interrupter and the separable contacts, and controlling operation of the actuator based on whether the current is flowing within the circuit interrupter.

In another embodiment, a circuit interrupter is provided that includes separable contacts, an actuator, such as a solenoid, operatively coupled to the separable contacts, and a control unit operatively coupled to the actuator. The control unit is structured and configured to (i) detect that a fault condition exists, and (ii) subsequent to detecting that the fault condition exists, determine whether a current is flowing within the circuit interrupter between a load side of the circuit interrupter and the separable contacts, and control operation of the actuator based on whether the current is flowing within the circuit interrupter.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
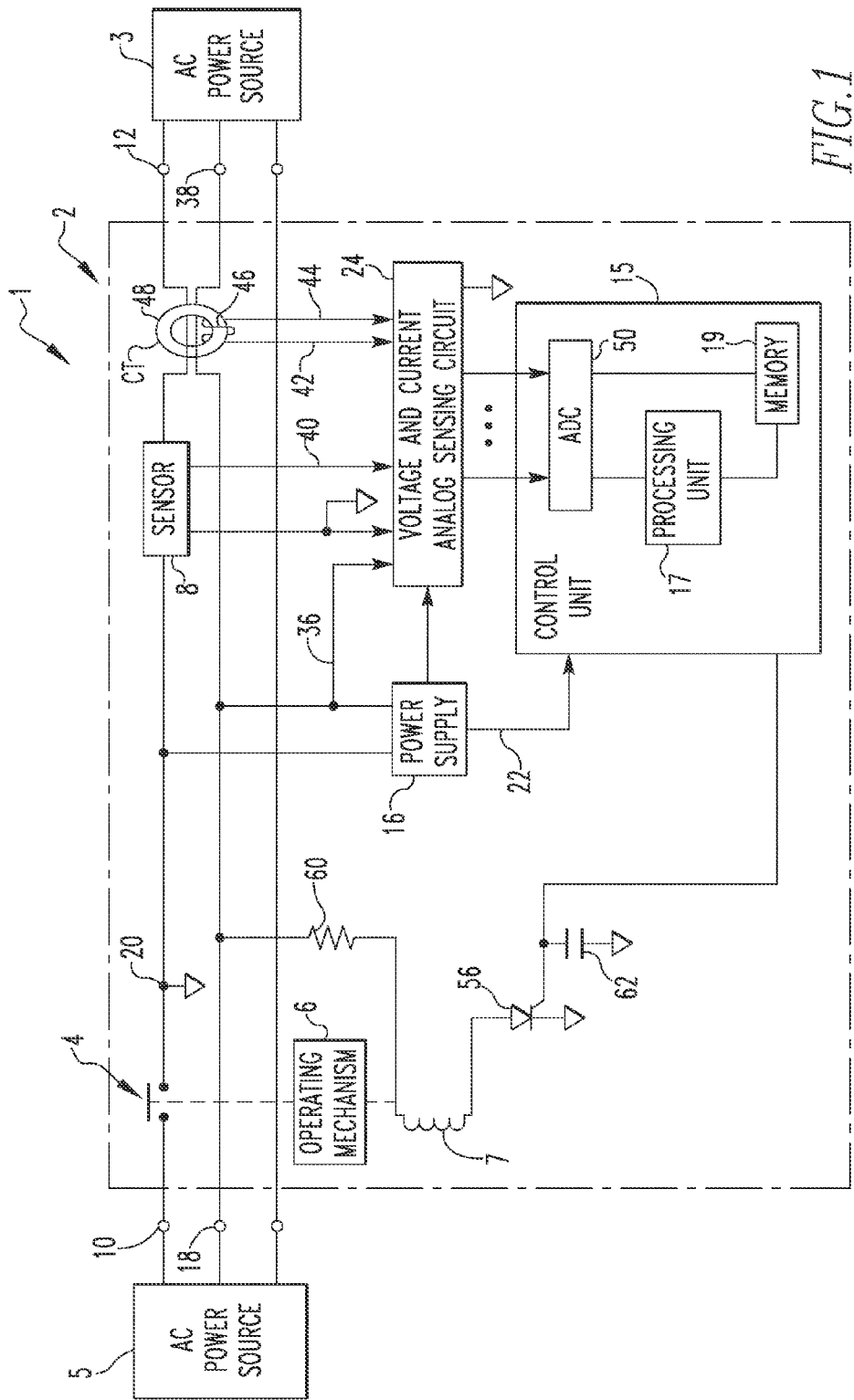
FIG. 1 is a schematic diagram of a power system according to an exemplary embodiment of the present invention.

Directional phrases used herein, such as, for example, left, right, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 is a schematic diagram of a power system 1 according to an exemplary embodiment of the present invention. Power system 1 includes a circuit interrupter 2 described in detail below, which in the illustrated embodiment is in the form of a reverse fed (or back fed) arc fault circuit interrupter (AFCI). Power system 1 also includes an AC power source 3, which may be, for example and without limitation, a PV cell array with an inverter or DC-to-AC converter, coupled to a first side of circuit interrupter 2, and a second AC power source 5, which is usually supplied by an electric utility, coupled to a second side of circuit interrupter 2 for receiving an AC power output from AC power source 3 via circuit interrupter 2.

In typical circuit breaker applications, there is a "source" that provides power (like an electric utility) and a "load" that consumes power (like a motor), and when the breaker trips it usually disconnects a fault on the load side from the power source. However, in the present embodiment of FIG. 1, the conventional breaker concepts of "source" and "load" do not directly apply, because there is a circuit breaker functioning to disconnect two power sources (AC power source 3 and AC power source 5). This issue is historically encountered in electric utility power transmission systems, but not usually within residential power systems. However, with distributed generation such as PV arrays becoming more prevalent, this issue will be encountered in residential power systems more and more.

If conventional breaker terms are applied to FIG. 1, AC power source 5 is considered the "source" and item 10 is considered the "line terminal" (the "second side" of circuit interrupter 2 described above is thus the "line side" of circuit interrupter 2). In addition, AC power source 3 is considered the "load" and item 12 is considered the "load terminal" (the "first side" of circuit interrupter 2 described above is thus the "load side" of circuit interrupter 2). These particular terms are chosen because AC power source 5 is the dominant source of power in this example (for instance, a large-scale electric utility power distribution network). AC power source 3 is also a source of power, such as a PV array with an inverter or DC-to-AC converter, but the maximum power that can be provided by AC power source 3 is far less than the maximum power that can be provided by AC power source 5. Nevertheless, by controlling the phase angles and amplitudes of the voltage and current produced by AC power source 3 with respect to the voltage of AC power source 5, AC power source 3 can supply power to AC power source 5.

FIG. 1 illustrates a single-phase case, but it will be understood that this is not meant to be limiting and that the present invention also applies to multiple (e.g., three) phase cases. In addition, the circuitry shown in the FIG. 1 exemplary embodiment is referenced to the line conductor (at item 20). This is also not meant to be limiting, as the circuitry may also be referenced to other conductors.

As seen in FIG. 1, circuit interrupter 2 includes separable contacts 4, an operating mechanism 6 structured to open and close the separable contacts 4 when actuated by an actuator 7 (described elsewhere herein and, which, in the exemplary embodiment is a solenoid), and a sensor 8 structured to sense current flowing through the separable contacts 4 between a line terminal 10 and a load terminal 12. Circuit interrupter 2 also includes a control unit 15 having a processing unit 17 and a memory 19. Control unit 15 cooperates with sensor 8 and operating mechanism 6 and actuator 7 to trip open separable contacts 4 under certain conditions as described elsewhere herein. Processing unit 17 may be, for example and without limitation, a microprocessor (μP) that interfaces with memory 19. Memory 19 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. Memory 19 has stored therein a number of routines that are executable by processing unit 17. One or more of the routines implement (by way of computer/processor executable instructions) one or more of the methods of tripping a circuit interrupter being operated in a back fed configuration that are described in greater detail below.

Circuit interrupter 2 further includes a power supply 16 which is, in the exemplary embodiment, an alternating current (AC) to direct current (DC) (AC/DC) power supply which receives a line-to-neutral voltage 36 between a neutral terminal 18 and a common reference node 20 that is disposed between the separable contacts 4 and the sensor 8. The AC/DC power supply 16 provides a suitable DC voltage 22 to control unit 15 and other components of circuit interrupter 2 as needed.

Circuit interrupter 2 also further includes a voltage and current analog sensing circuit 24 that receives inputs of the line-to-neutral voltage 36 from the neutral terminal 18 and the load neutral terminal 38, a voltage 40 representative of the current flowing through the current sensor 8, and signals 42 and 44 from the secondary 46 of a current transformer (CT) 48, which detects a ground fault condition responsive to any significant difference between the line and neutral currents. The various voltage and current signals from the voltage and current analog sensing circuit 24 are input by a plural channel analog to digital converter (ADC) 50 of control unit 15 and are converted to corresponding digital values for input by the processing unit 17 and/or memory 19.

Responsive to one or more current conditions as sensed from the voltage 36, the voltage 40 and/or the signals 42,44, processing unit 17 will detect a fault condition that necessitates the opening of separable contacts 4. In response to the detected fault condition (i.e., in response to an overvoltage, an arc fault, a ground fault or other fault condition), processing unit 17 will, in at least one of the manners described herein (FIGS. 2 and 3), cause actuator 7 (e.g., a solenoid) to be energized by turning on an electronic switch 56 (e.g., without limitation, an SCR or a triac) in series with the actuator 7, and thereby actuate the operating mechanism 6 to trip open the separable contacts 4. More specifically, actuator 7 and electronic switch 56 are typically together referred to as a "trip circuit", and this trip circuit is connected across the 120 VAC supplied by the utility. During normal operation, electronic switch 56 is in the "blocking" state, so no current flows in actuator 7. When processing unit 17 identifies a potentially circuit hazardous condition, a signal directs electronic switch 56 to transition to a "conducting" state, so the utility 120 VAC threes current to flow in the solenoid, which produces a magnetic field that unlatches the breaker mechanism. In one embodiment (FIG. 2), the trip circuit components (electronic switch 56 and actuator 7) are not rated for continuous current conduction, but instead are only sized to endure a momentary current pulse (because that is usually adequate to open operating mechanism 6). In another embodiment (FIG. 3), the trip circuit components (electronic switch 56 and actuator 7) are rated for continuous current conduction.

In addition, as seen in FIG. 1, in the illustrated embodiment, a resistor 60 in series with the coil of actuator 7 (which in the illustrated embodiment is a solenoid 7) limits the coil current and a capacitor 62 protects the gate of the electronic switch 56 from voltage spikes and false tripping due to noise. Alternatively, resistor 60 may be omitted, and instead the current in the solenoid may be limited only by the forward drop of the electronic switch and by the solenoid impedance.

Figure 2:
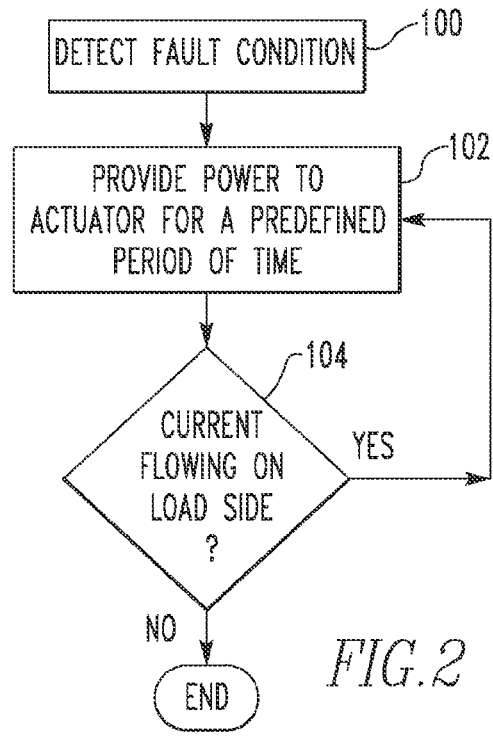
FIG. 2 is a flowchart showing a method of tripping a circuit interrupter of the system of FIG. 1 according to one particular embodiment of the present invention.

FIG. 2 is a flowchart showing a method of tripping circuit interrupter 2 according to one particular embodiment of the present invention. As described below, the method of FIG. 2 detects current flowing through circuit interrupter 2, rather than voltage in circuit interrupter 2, to determine whether separable contacts 4 are open or closed, and thus whether actuator 7 needs to be energized or can be shut off. As will be appreciated, this will allow circuit interrupter 2 to operate correctly in its back fed or reverse fed configuration. As noted elsewhere herein, the method of FIG. 2 may be implemented in one or more routines stored in memory 19 and executed by processing unit 17. The method begins at step 100, wherein processing unit 17 detects a fault condition as described elsewhere herein. Then, at step 102, processing unit 17 will cause power to be provided to actuator 7 for a certain, predetermined limited time period as described elsewhere herein (i.e., it is pulsed). The time period of step 102 is a period that should normally be sufficient to cause the separable contacts 4 to completely open. Next, at step 104, processing unit 17 receives a current measurement from sensor 8, and based thereon determines whether current is flowing within circuit interrupter 2 (between the load side/terminals and separable contacts 4). If the answer at step 104 is yes, then that indicates that separable contacts 4 have for some reason not been successfully opened. In such a situation, the method returns to step 102, and an effort is once again made to open separable contacts 4. If however, the answer at step 104 is no, then that indicates that separable contacts 4 have been successfully opened, and the method ends.

Figure 3:
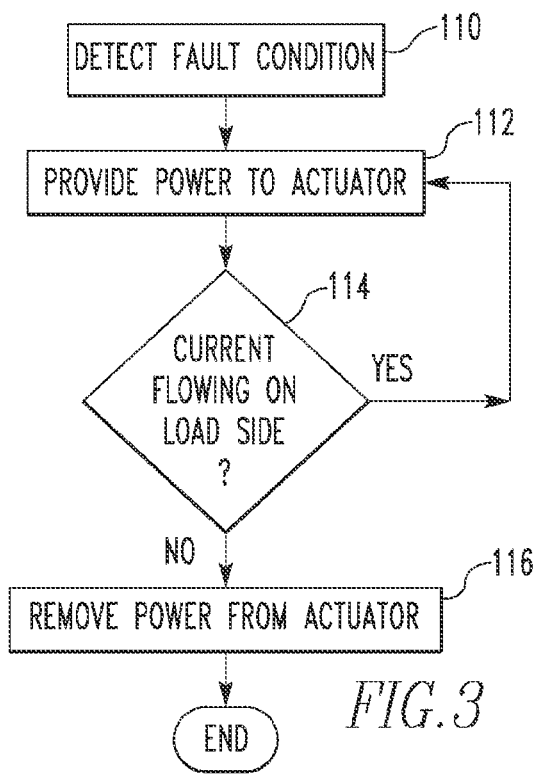
FIG. 3 is a flowchart showing a method of tripping a circuit interrupter of the system of FIG. 1 according to another particular embodiment of the present invention.

FIG. 3 is a flowchart showing a method of tripping circuit interrupter 2 according to an alternative particular embodiment of the present invention. As described below, the method of FIG. 3, like the method of FIG. 2 described above, detects current flowing through circuit interrupter 2, rather than voltage in circuit interrupter 2, to determine whether separable contacts 4 are open or closed, and thus whether actuator 7 needs to be energized or can be shut off. The method of FIG. 3 may be implemented in one or more routines stored in memory 19 and executed by processing unit 17. The method begins at step 110, wherein processing unit 17 detects a fault condition as described elsewhere herein. Then, at step 112, processing unit 17 will cause power to be provided to actuator 7 as described elsewhere herein (continuously). Next, at step 114, processing unit 17 receives a current measurement from sensor 8, and based thereon determines whether current is flowing within circuit interrupter 2 (between the load side/terminals and separable contacts 4). If the answer at step 114 is yes, then that indicates that separable contacts 4 have for some reason not been successfully opened. In such a situation, the method returns to step 112. If, however, the answer at step 114 is no, then that indicates that separable contacts 4 have been successfully opened, and the method proceeds to step 116. At step 116, processing unit 17 will cause power to be removed from actuator 7, in effect shutting it off/down.

While specific embodiments of the disclosed concept have been described detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of tripping a circuit interrupter in a back fed configuration, the circuit interrupter having separable contacts and an actuator operatively coupled to the separable contacts, the method comprising:
    detecting within the circuit interrupter that a fault condition exists;
    providing power to the actuator in response to detecting that the fault condition exists; and
    subsequent to providing power to the actuator, determining whether a current is flowing within the circuit interrupter between a load side of the circuit interrupter and the separable contacts, and controlling operation of the actuator based on whether the current is flowing within the circuit interrupter.

2. The method according to claim 1, wherein the step of providing power to the actuator further comprises providing power to the actuator for a predetermined period of time in response to detecting that the fault condition exists, the method including determining that the current is not flowing within the circuit interrupter and in response thereto not providing power to the actuator.

3. The method according to claim 1, wherein the step of providing power to the actuator further comprises providing power to the actuator for a predetermined period of time in response to detecting that the fault condition exists, the method including determining that the current is flowing within the circuit interrupter and in response thereto again providing power to the actuator for the predetermined period of time.

4. The method according to claim 1, including determining that the current is not flowing within the circuit interrupter and in response thereto removing the power from the actuator.

5. The method according to claim 1, wherein the actuator is a solenoid.

6. The method according to claim 1, wherein the circuit interrupter is an arc fault circuit interrupter or a ground fault circuit interrupter.

7. A circuit interrupter, comprising:
    separable contacts;
    an actuator operatively coupled to the separable contacts; and
    a control unit operatively coupled to the actuator, the control unit being structured and configured to (i) detect that a fault condition exists, (ii) cause power to be provided to the actuator in response to detecting that the fault condition exists, and (iii) subsequent to providing power to the actuator, determine whether a current is flowing within the circuit interrupter between a load side of the circuit interrupter and the separable contacts, and control operation of the actuator based on whether the current is flowing within the circuit interrupter.

8. The circuit interrupter according to claim 7, wherein the control unit is structured and configured to cause power to be provided to the actuator for a predetermined period of time in response to detecting that the fault condition exists, and wherein the control unit is further structured and configured to: (iv) responsive to determining that the current is not flowing within the circuit interrupter, cause power to not be provided to the actuator, and (v) responsive to determining that the current is flowing within the circuit interrupter again, cause power to be provided to the actuator for the predetermined period of time.

9. The circuit interrupter according to claim 7, wherein the control unit is further structured and configured to remove the power from the actuator in response to determining that the current is not flowing within the circuit interrupter.

10. The circuit interrupter according to claim 7, wherein the actuator is a solenoid.

11. The circuit interrupter according to claim 7, wherein the circuit interrupter is an arc fault circuit interrupter or a ground fault circuit interrupter.

12. A power system, comprising:
    a circuit interrupter according to claim 7,
    a first AC power source coupled to the load side of the circuit interrupter to back feed the circuit interrupter; and
    a second AC power source coupled to a line side of the circuit interrupter.

13. The power system according to claim 12, wherein the first AC power source is a photovoltaic cell array with an inverter or DC-to-AC converter.

* * * * *